March 21, 1961 E. A. ULRICH 2,975,903
FILTER
Filed Oct. 31, 1957 3 Sheets-Sheet 1

INVENTOR.
EDWARD A. ULRICH
BY
Albert L. Jeffers
ATTORNEY

March 21, 1961   E. A. ULRICH   2,975,903
FILTER
Filed Oct. 31, 1957   3 Sheets-Sheet 2

INVENTOR.
EDWARD A. ULRICH
BY
Albert L. Jeffers
ATTORNEY

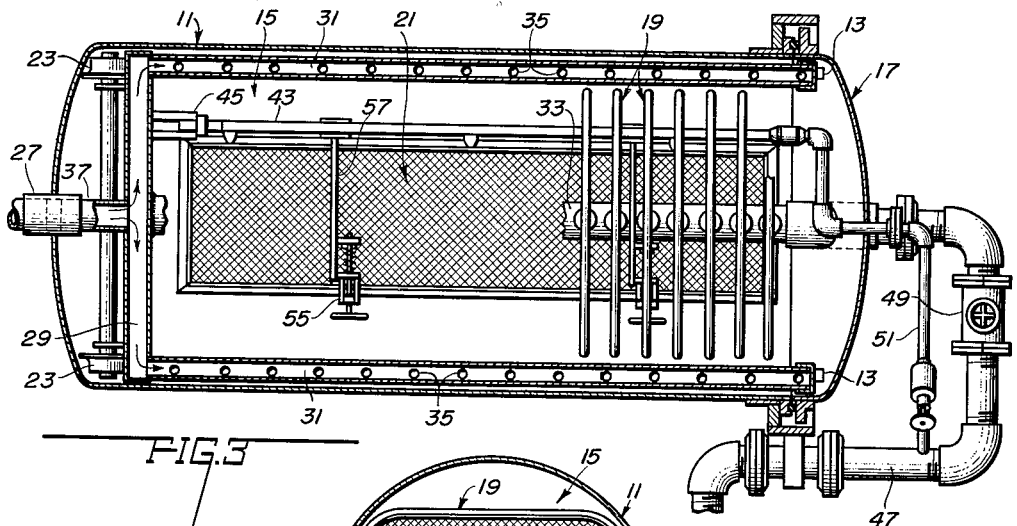
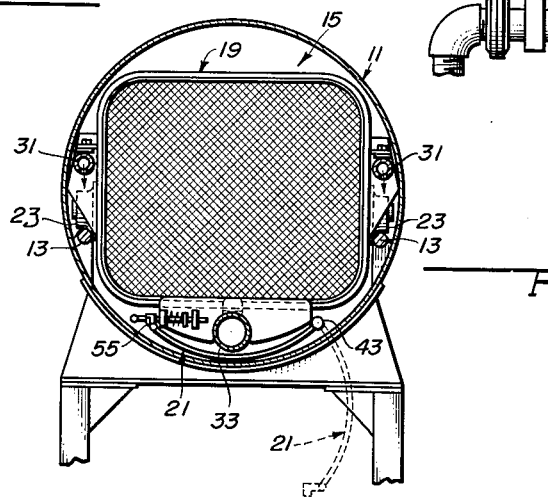
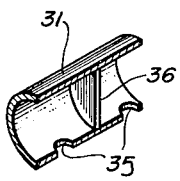
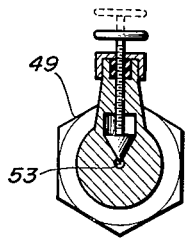
INVENTOR.
EDWARD A. ULRICH
BY
ATTORNEY

United States Patent Office 2,975,903
Patented Mar. 21, 1961

2,975,903
FILTER

Edward A. Ulrich, Kenmore, N.Y., assignor to Process Filters, Inc., Buffalo, N.Y., a corporation of New York Filed Oct. 31, 1957, Ser. No. 693,700

4 Claims. (Cl. 210—236)

The invention relates generally to filters and more particularly is directed to relatively large tank filters for filtering liquids.

One of the principal objects of the invention is to provide a tank with a bank or a plurality of corresponding filters or means which are individually operatively connected to a manifold which serves to carry the filtrate away from the tank for the use intended and a pair of tubular conductors provided with apertures or orifices which direct the liquid to be filtered in a predetermined pattern for reception by the filters.

A significant object of the invention is to provide a recovery filter which is designed and constructed for disposition in the bottom of the tank below the bank of filters to filter all of the liquid remaining in the tank following the completion of a batch thereof. In other words, the liquid left in the tank, which due to the location of the bank of filters cannot be filtered by them is filtered by the recovery filter.

A particular object of the invention is to provide the tank with tracks and a carriage for the manifold and filters thereon, mounted on tracks to facilitate movement of the carriage longitudinally in and out of the tank to afford access to the internal components of the filter structure.

A specific object of the invention is to provide a conveyor or trolley which may be connected to the carriage to promote its movement with respect to the tank.

Also, an object of the invention is to provide improved means for attaching the recovery filter to the carriage and a novel setup for connecting a separate line from the recovery filter to an outlet through which the filtrate flows after subjection to the filter.

Other attributes of the invention reside in providing a filter tank or system which overcomes the difficulties encountered with the settlement of solids in the product to be filtered and which offers advantages with respect to manufacture and assembly, installation, efficiency and durability.

Additional objects and advantages of the invention will become apparent after the description hereinafter set forth is considered in conjunction with the drawings annexed hereto.

In the drawings wherein a preferred embodiment of the invention is disclosed:

Figure 3 is a longitudinal section taken substantially on line 3—3 of Figure 1;

Figure 4 is a transverse or vertical section taken substantially on line 4—4 of Figure 1;

Figure 5 is a transverse section of a gate valve assembly shown in Figure 3; and Figure 6 is a partial perspective view depicting certain structural details of one of the tubular conductors which carry the liquid to the bank of filters.

Figure 1:
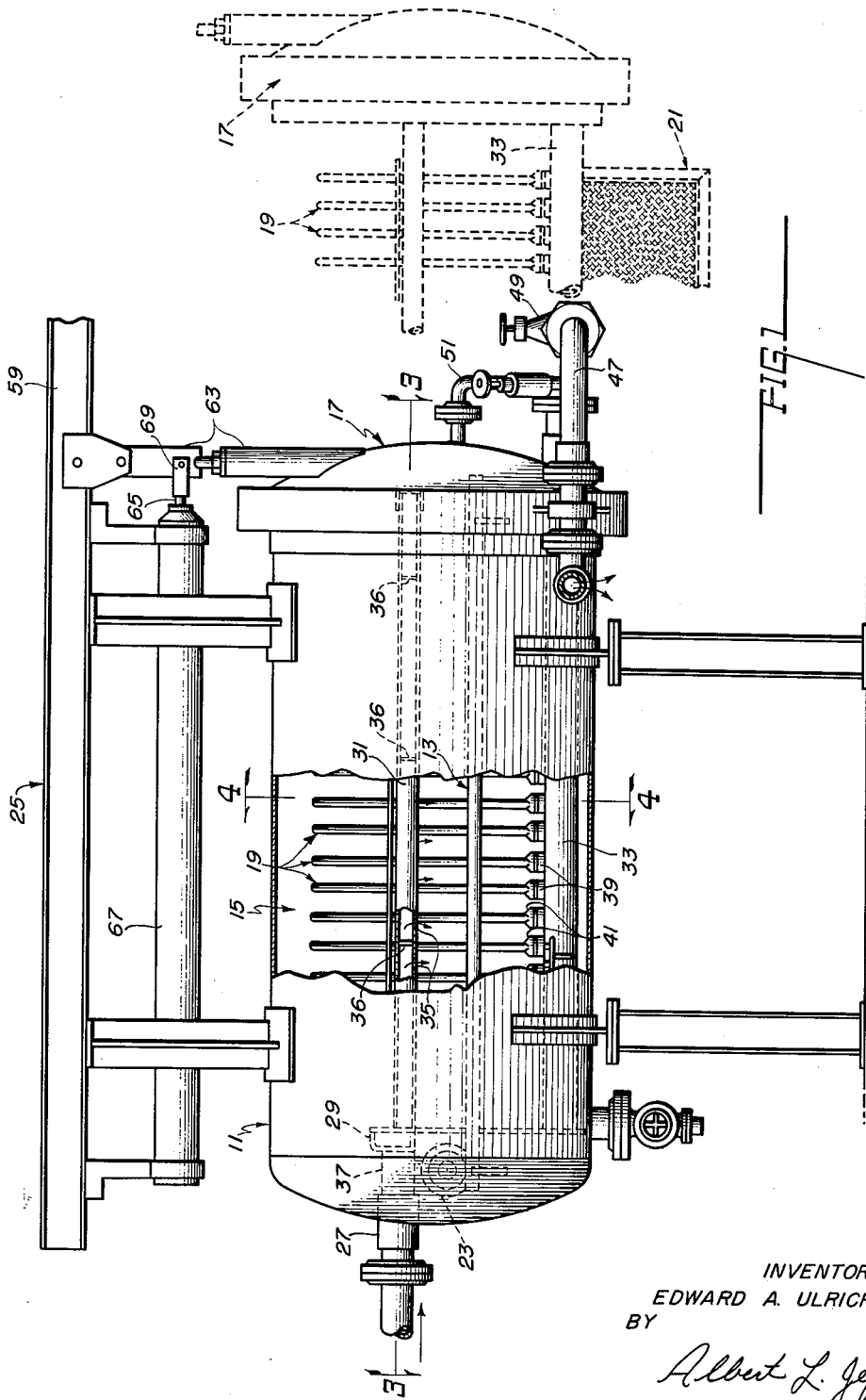
Figure 1 is a side elevational view of the tank and a conveyor for a part thereof, with portions of the structure in section to illustrate details.

The structure embodying the invention may be designed and constructed in various ways but as disclosed in the drawings preferably includes, among other things, a tank having a housing generally designated 11 provided with internal tracks 13, and a carriage 15 connected to a head or end closure 17 and provided with a bank of vertical filter units or means 19, and a recovery filter 21 below the filter means 19. The carriage is also provided with wheels 23 for mounting and rolling the carriage on the tracks longitudinally in and out of the tank, and a conveyor 25 is connected to the head for supporting and moving the carriage relative to the tank. In other words, the tracks primarily serve to support the carriage in a centralized position with the housing of the tank and when the carriage is moved outwardly by the conveyor the latter supports the outer extremity of the unit, including the head, all for the purpose of facilitating assembly of the components, repair and/or replacement of the filters.

The tank, among other things, includes the housing above referred to and a solid end wall which is provided with a tubular inlet 27 extending longitudinally into the tank. The tracks 13 preferably comprise a pair of elongated cylindrical rods which extend lengthwise in parallel horizontal relationship in the lower part of the tank.

The carriage 15 may be designed and constructed in various ways, but as disclosed herein, preferably comprises a hollow header or casing 29, a pair of horizontal tubular conductors 31 joining the casing and head 17, a manifold 33 joining the casing and head and supporting the filters 19, and the recovery filter 21.

The tubular conductors 31 are preferably in the form of pipes and these pipes are provided with a plurality of apertures or orifices 35 which are so disposed that the liquid passing therethrough will be directed angularly against or between the filters 19 to promote the latter's reception of the unfiltered liquid. In other words, the unfiltered liquid is first presented to the filters through the orifices as distinguished from a conventional setup in which the liquid enters a chamber through a single passage for circulation about a filter or filters. The conductors are also preferably provided with baffles 36 interposed between the orifices at appropriate locations to slow down and obtain a uniform rate of flow of the liquid through the orifices. The conductors are communicatively connected to the header 29 for receiving the unfiltered liquid therefrom. The header, which distributes the liquid to the conductors, is provided with a tubular inlet 37 which is adapted to telescopically connect with the tubular inlet 27 on the tank housing when the carriage is moved rearwardly into the housing a predetermined distance.

The manifold 33 is preferably in the form of a relatively large pipe and provided with a plurality of tubular seats 39. The filters 19 are provided with fittings 41 for detachable sealed attachment with the seats for communicatively connecting the filters to the manifold and mounting the filters in erect parallel relationship. The filters may, of course, be constructed as desired and mounted in any suitable positions on the manifold. More specifically in this regard, each of the filters preferably comprises a rectangular frame or circular having screens secured in spaced relationship to the frame, with a layer of filter material, such as diatomaceous earth, thereon, so that the unfiltered liquid introduced into the tank through the orifices by way of the conductors, header and inlets will be projected directly against or between the filters for passage through the layer and screens to separate foreign matter therein for deposit on the filters while allowing the filtrate to pass between the screens of each filter into the manifold. Attention is directed to the fact that the sizes or cross-sectional dimensions of the various inlets, pipes, openings, orifices, fittings and character of the filters are predetermined to obtain the desired rate of flow therethrough.

The recovery or supplemental filter 21 is preferably generally channel in shape or curved in cross-section throughout its length and of a size sufficient to extend underneath or below the bank of filters 19. The opposite or upper and lower sides of the recovery filter present relatively large surface areas through which the unfiltered liquid may circulate. The recovery filter is constructed somewhat similar to the other filters but includes a pipe 43 having its inner end journalled in a bracket 45 carried by the header 29 and its outer end journalled in the head 17. The pipe is provided with openings (not shown) communicating with the interior of the recovery filter in order that the filtrate will flow between the screens thereof into the pipe 43 which is connected to a larger pipe 47 which also receives the filtrate from the manifold 33. The large pipe through which the filtrate flows to a particular destination for use is provided with a gate valve 49 and the pipe 43 is connected to the large pipe or recovery line by a pipe 51 at a location beyond the gate valve. This valve is preferably drilled to provide a pilot hole 53 which maintains a differential pressure and flows across the recovery filter during filtration on the bank of filters in processing the greatest quantity of the batch. This flow is so low that it does not build the same thickness of cake as on the bank of filters, but by this means the cake is maintained in place even on the underside of the recovery filter. By maintaining the differential, the solids are not subjected to the influences of gravity or buoyancy, such that when the valve is open and air pressure is placed on the tank for blow down there is no "dirty shot" of solids in the initial filtrate.

Figure 2:
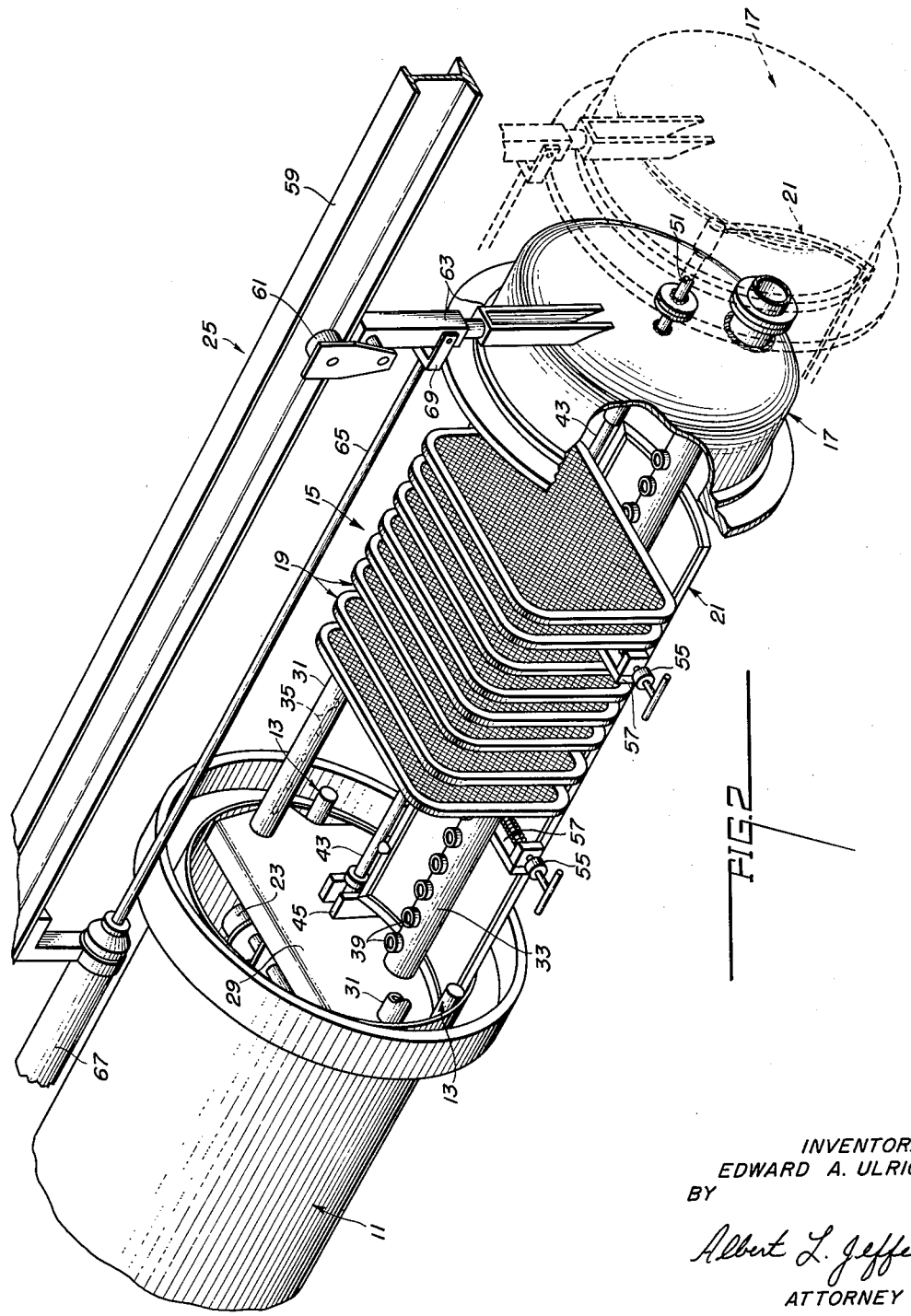
Figure 2 is a perspective view showing the carriage and components thereon in an extended position.

The pipe 43 affords a hinge or pivot means for the recovery filter so the filter may be swung downwardly for releasing any foreign matter therein as illustrated in Figures 2 and 4, or readily detached from the carriage for repair or replacement. The recovery filter may be releasably held in an operative position by a plurality of longitudinal spring-pressed fasteners 55, or other latch means mounted on fixed cross-bars 57. This recovery filter structure is novel and affords a means whereby substantially all of a quantity of unfiltered liquid left in the lower part of the tank after processing a batch of given quantity of unfiltered liquid is filtered so that the filtrate therefrom will flow through the pipe or line 43 and join that flowing from the manifold. In other words, the recovery filter serves to filter unfiltered liquid, which, due to the upper location of the bank of filters, cannot be filtered by the latter. In this way substantially all of a given quantity of liquid introduced into the tank is filtered. The bank of filters may be referred to as a primary filter assembly and the recovery filter as a supplementary or secondary filter. It is to be understood that suitable fittings such as nipples, elbows and unions are employed to obtain the desired detachable or permanent connections between the various pipes, inlets, valves, etc.

As alluded to above, a conveyor generally designated 25 is preferably employed to assist in moving and supporting the carriage and head relative to the tank housing. Any conveyor suitable for the purpose may be utilized but the one disclosed comprises an overhead beam 59 having tracks on which wheels 61 roll. These wheels are carried by a sheave which is pivotally connected to the head 17 of the tank by the structure 63. A rod 65 is carried by an air cylinder 67 and pivotally connected to the structure 63 by a bracket 69. This rod, through the power offered by the cylinder, serves to move the carriage and head in or out of the tank housing as desired and when the carriage is extended its outer extremity is supported by the conveyor. With this unique set-up one may readily obtain access to the internal components of the tank to facilitate repair or replacement of such components.

Having thus described my invention, it is obvious that various modifiations may be made in the same without departing from the spirit of the invention, and, therefore, I do not wish to be understood as limiting myself to the exact form, construction, arrangement, and combination of parts herein shown and described.

I claim:

1. A filter structure comprising an elongated tank provided with a tubular inlet, and a carriage mounted in the tank, said carriage comprising a header having a chamber provided with a tubular inlet telescopically connected to the first-mentiond tubular inlet, a support, a manifold carried by the header and support for dispensing a filtrate from the tank, a plurality of primary filter means connected to the manifold in positions substantially transverse to the longitudinal axis of the tank for filtering liquid in the tank so the filtrate will flow into the manifold, a tubular conductor carried by the header and support and communicating with the chamber, said conductor being provided with apertures through which the liquid to be filtered is directed angularly toward the filter means said conductor provided with baffles spaced between said apertures so that a uniform rate of flow of the liquid will flow through the apertures, a secondary filter movably mounted on the carriage below the primary filter means, and a pipe independent of the manifold for conducting the filtrate from the filter away from the tank.

2. The structure defined in claim 1, including track means in the tank, and means on the carriage cooperating with the track means for supporting the carriage for longitudinal movement.

3. The structure defined in claim 1, including means in the tank and on the carriage for slidably supporting the carriage, and a conveyor connectible to the support for sliding the carriage and supporting its outer extremity when extended from the tank.

4. A filter structure comprising a tank having a housing provided with an inlet and an outlet, a closure for the housing, a carriage slidably mounted in the tank, said carriage comprising a header having a chamber provided with an inlet connected to the first mentioned inlet, a manifold carried by the header and end closure and extending through the latter for dispensing a filtrate from the tank, primary filter means mounted on the manifold for filtering liquid in the tank so the filtrate will flow into the manifold a plurality of conductors carried by the header and closure and communicating with the header, and said conductors being provided with apertures through which the liquid to be filtered is directed angularly toward the filter means, the improvement comprising a relatively large secondary filter mounted on the carriage below the filter means for filtering unfiltered liquid in the bottom of the tank which cannot be filtered by the filter means, said secondary filter provided with filtering surface areas on its upper and lower side through which the unfiltered liquid may circulate, means for maintaining a differential pressure across the filtering surface areas of said secondary filter so that a filter cake is maintained on its upper and lower side when said filter is in operation, and a pipe independent of the manifold directly connected to the filter and extending through the tank for conducting the filtrate from the filter.

References Cited in the file of this patent

UNITED STATES PATENTS

| Re. 14,213 | Sweetland | Nov. 7, 1916 |
| 2,221,210 | Soderquist | Nov. 12, 1940 |
| 2,732,079 | Hunziker | Jan. 24, 1956 |
| 2,754,004 | D'Urso | July 10, 1956 |
| 2,843,267 | Anderson | July 15, 1958 |

FOREIGN PATENTS

| 1,087,301 | France | Aug. 25, 1954 |
| 1,128,777 | France | Aug. 27, 1956 |